(12) United States Patent
Chitrapu (10) Patent No.: US 11,166,200 B2
(45) Date of Patent: *Nov. 2, 2021

(54) SYSTEM AND METHOD FOR FINE GRAINED SERVICE MANAGEMENT USING SDN-NFV NETWORKS

(71) Applicant: AT&T Intellectual Property I, L.P., Atlanta, GA (US)

(72) Inventor: Prabhakar Chitrapu, Blue Bell, PA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/860,961

(22) Filed: Apr. 28, 2020

(65) Prior Publication Data

US 2020/0260335 A1  Aug. 13, 2020

Related U.S. Application Data

(63) Continuation of application No. 15/618,626, filed on Jun. 9, 2017, now Pat. No. 10,674,409.

(51) Int. Cl.
*H04W 28/24* (2009.01)
*H04L 12/24* (2006.01)
(Continued)

(52) U.S. Cl.
CPC ......... *H04W 28/24* (2013.01); *H04L 12/4625* (2013.01); *H04L 12/4641* (2013.01);
(Continued)

(58) Field of Classification Search
CPC ... H04W 28/24; H04W 28/18; H04W 72/087; H04W 429/24; H04L 12/4625;
(Continued)

(56) References Cited

U.S. PATENT DOCUMENTS 5,684,714 A   11/1997   Yogeshwar et al.
5,737,581 A   4/1998    Keane
(Continued)

FOREIGN PATENT DOCUMENTS

JP    2012-147299 A      8/2012
WO    WO 2010/100315 A1  9/2010
WO    WO 2016/091292 A1  6/2016

OTHER PUBLICATIONS

Chen et al.; "A Framework for Experimenting with QoS for Multimedia Services"; Electronic Imaging: Science & Technology, Int'l Society for Optics and Photonics; 1996; 12 pages.
(Continued)

*Primary Examiner* — Christopher B Robinson
(74) *Attorney, Agent, or Firm* — BakerHostetler (57) ABSTRACT

A system and method are described that provide user-controlled Quality of Experience (QoE) in a network of resources. QoE or service parameter profiles of an SDN-NPV network are mapped to options for user selection using a QoE selector knob. The user selects the desired QoE or service parameter profile from the available options and the SDN-NPV network configuration is implemented that corresponds to the desired QoE or service parameter profile.

20 Claims, 8 Drawing Sheets

(51) Int. Cl.
  *H04L 12/46* (2006.01)
  *H04W 72/08* (2009.01)
  *H04L 29/06* (2006.01)
  *H04L 12/911* (2013.01)
  *H04L 12/927* (2013.01)
  *H04W 28/18* (2009.01)
  *H04L 29/08* (2006.01)
  *H04W 28/06* (2009.01)
  *H04W 4/08* (2009.01)
  *H04L 29/12* (2006.01)
  *G06Q 50/18* (2012.01)
  *G06Q 30/06* (2012.01)
  *H04L 12/725* (2013.01)

(52) U.S. Cl.
  CPC .......... *H04L 41/0896* (2013.01); *H04L 41/12* (2013.01); *H04L 41/5051* (2013.01); *H04L 41/5067* (2013.01); *H04L 47/783* (2013.01); *H04L 47/805* (2013.01); *H04L 63/0272* (2013.01); *H04W 28/18* (2013.01); *H04W 72/087* (2013.01); *G06Q 30/0631* (2013.01); *G06Q 50/188* (2013.01); *H04L 45/302* (2013.01); *H04L 45/306* (2013.01); *H04L 61/2514* (2013.01); *H04L 67/322* (2013.01); *H04W 4/08* (2013.01); *H04W 28/06* (2013.01)

(58) Field of Classification Search
  CPC . H04L 12/4641; H04L 41/0896; H04L 41/12; H04L 41/5051; H04L 41/5067; H04L 47/783; H04L 47/805; H04L 63/0272; H04L 67/806; G06Q 30/0631; G06Q 50/188
  See application file for complete search history.

(56) References Cited

U.S. PATENT DOCUMENTS

| | | | |
|---|---|---|---|
| 5,999,598 A | 12/1999 | Henrick et al. | |
| 7,047,366 B1 | 5/2006 | Ezra | |
| 7,293,094 B2 | 11/2007 | Vaman et al. | |
| 8,280,994 B2 | 10/2012 | Blouin et al. | |
| 8,712,389 B2 | 4/2014 | Joul et al. | |
| 8,989,281 B2 | 3/2015 | Sullivan et al. | |
| 9,036,888 B2 | 5/2015 | Kamath et al. | |
| 9,118,694 B2 | 8/2015 | Levillain et al. | |
| 9,131,072 B1 | 9/2015 | Kakadia et al. | |
| 9,173,133 B2 | 10/2015 | Cazanas et al. | |
| 9,219,765 B2 | 12/2015 | Lyle et al. | |
| 9,426,029 B2 | 8/2016 | Saavedra | |
| 9,444,863 B2 | 9/2016 | Rehan et al. | |
| 2010/0217780 A1 | 8/2010 | Erola et al. | |
| 2011/0302276 A1* | 12/2011 | Karaoguz | H04L 41/0816 709/219 |
| 2012/0028643 A1 | 2/2012 | Falchuk et al. | |
| 2012/0151057 A1 | 6/2012 | Paredes et al. | |
| 2013/0055136 A1 | 2/2013 | Aaron et al. | |
| 2015/0264098 A1 | 9/2015 | Dao et al. | |
| 2015/0341812 A1 | 11/2015 | Dion et al. | |
| 2016/0028647 A1 | 1/2016 | Ramakrishnan et al. | |
| 2016/0105489 A1* | 4/2016 | Llorca | G06F 9/50 709/226 |
| 2016/0105821 A1 | 4/2016 | Senarath et al. | |
| 2016/0204995 A1 | 7/2016 | Sanda et al. | |
| 2016/0255205 A1 | 9/2016 | Russell | |
| 2016/0277509 A1* | 9/2016 | Qiang | H04L 67/16 |
| 2016/0315808 A1 | 10/2016 | Saavedra | |
| 2016/0352924 A1 | 12/2016 | Senarath et al. | |
| 2017/0104609 A1* | 4/2017 | McNamee | H04M 15/66 |
| 2017/0177396 A1* | 6/2017 | Palermo | H04L 49/70 |
| 2017/0289047 A1* | 10/2017 | Szilagyi | H04L 41/0853 |
| 2018/0027293 A1* | 1/2018 | Yamamoto | G06F 13/00 725/86 |
| 2018/0131580 A1* | 5/2018 | Tomkins | H04L 41/0823 |
| 2018/0227243 A1* | 8/2018 | Zhang | H04L 41/12 |
| 2020/0007413 A1* | 1/2020 | Kerpez | H04L 41/5019 |

OTHER PUBLICATIONS

Nahrstedt et al.; "QoS-Aware Middleware for Ubiquitous and Heterogeneous Environments"; IEEE Communications Magazine; 39.11; Nov. 2001; p. 140-148.
"Series E: Overall Network Operation, Telephone Service, Service Operation and Human Factors"; ITU-T E.800; International Telecommunication Union; 2009; 30 pages.
Brunnstrom et al.; "Qualinet White Paper on Definitions of Quality of Experience"; HAL archives-ouvertes; Mar. 2013; 25 pages.
"ECOMP (Enhanced Control, Orchestration, Management & Policy) Archicture White Pater"; AT&T Inc.; http://about.att.com/content/dam/snrdocs/ecomp.pdf; 2016; accessed Apr. 6, 2021; 31 pages.

* cited by examiner

SYSTEM AND METHOD FOR FINE GRAINED SERVICE MANAGEMENT USING SDN-NFV NETWORKS

CROSS-REFERENCE TO RELATED APPLICATION

This application claims priority to, and is a continuation of U.S. patent application Ser. No. 15/618,626, filed Jun. 9, 2017. U.S. patent application Ser. No. 15/618,626 is incorporated herein by reference in its entirety.

TECHNICAL FIELD

The invention relates to systems and methods for permitting a user to configure and use software to control a virtualized network in a fine grained and dynamic manner.

BACKGROUND

Software-controlled Virtualized Mobile Networks are referred to as Software Defined Networking Network Function Virtualization (SDN-NFV) networks in the industry. Such networks offer the ability to be configured dynamically under the control of the service provider, a network partner, or the end-user. Several new business cases are expected to be facilitated by such networks. Generally, SDN-NFV mobile networks look very similar to Data Center and Web Service Networks, so synergizing such networks can produce many positive business scenarios.

Today, there are a plethora of ways to make voice calls using Over-The-Top (OTT) techniques, such as Skype, Whatsapp, Facebook, GoogleTalk, etc. While these techniques provide the basic voice communication services to the end users, often the quality is sub-optimal and is not guaranteed. Yet, users often use these methods because it is cheap and the users are tolerant to certain degradation in quality of experience (including having to call multiple times when the call drops). In contrast, carriers such as AT&T have been offering a high quality, high reliability voice calls over its wireless and wired networks. However, since these calls use the licensed spectrum and network infrastructure, the user is charged for them. The users tend to use these high-quality voice services either when there is no cheaper alternative or when they cannot tolerate the undependable quality of the OTT techniques. For carriers, the problem is to find novel ways to retain the users within their networks to use their services.

Quality of Experience (QoE) is a known quality measure for networks. For example, WO 2016/091292 discloses a QoE enforcement system for a communications network that uses a QoE orchestrator to monitor data traffic related to a terminal device in order to detect the data flow related to an application session. The network node derives resource requirement information defining a QoE level to be provided to the terminal device regarding the application session and also performs QoE measurements to obtain information on QoE experience by the terminal device regarding the application session. Based on the QoE measurements, the network node executes one or more actions in order to enforce the QoE of the application session to meet resource requirements. Thus, the system adjusts itself to maintain a preset QoE level but does not permit a user to select the desired QoE level. Similar monitoring and control is provided in U.S. Pat. No. 9,426,029. Other systems, such as that described in US 2016/0204995 provide a dynamic selector for Quality of Service (QoS) control. A similar system for dynamic QoS control is disclosed in U.S. Pat. No. 9,219,765. However, none of these systems enables user control of QoE or network service parameters for a particular QoE using the SDN controlled NFV network tools.

This disclosure is directed to providing a way for users to choose the quality of service they are to receive in a virtualized communications environment, for example.

SUMMARY

It is desired by communications network service providers to transform their communications networks from being relatively static and slow to virtualized and dynamic software-controlled communications networks. As a result, the communications networks of conventional communications network service providers will be refactored into many small and standardized building blocks of network functions that can be created, used, managed and deleted in a highly dynamic manner in order to match the dynamic nature of the service demands. The invention is particularly useful in such a dynamic environment.

The system and methods described herein place the Quality of Experience (QoE) and other service parameter controls for a particular QoE in the hands of the end-user so that he/she may essentially have a QoE knob that permits the user to move from a free-best-effort QoE with a corresponding set of service parameters to a billed-guaranteed QoE with a corresponding set of service parameters in a granular fashion. Based on the QoE knob's position, the underlying network is dynamically configured by applying less or more controls to provide the appropriate QoE or service parameters for a desired QoE. Such a service may be provided directly to the end-user, when he/she is a subscriber of a network communications carrier such as AT&T, or to the OTT service provider when the network communications carrier offers its SDN-NFV network as a service to the OTT service provider (i.e., NWaas). In the former case, the OTT offerings may also be offered as options on the QoE knob so that the end-user does not have to leave the network carrier's service environment while enjoying the 3rd party services.

The system and method described herein implement a QoE knob that the user may use to configure and control chained services over a virtualized cloud network. The benefit of such a system and method is that the user no longer has to choose between different applications to trade off quality and cost. The user may set the dial from free of cost to the premium paid service, especially even during the duration of a communications setting. Such an approach fully exploits the dynamic near-real-time flexibility of a virtualized cloud network.

In exemplary embodiments, a system and corresponding method of providing user-controlled Quality of Experience (QoE) or other service parameter controls in a network of resources is provided. In exemplary embodiments, the method includes the steps of mapping particular QoE or service parameter profiles of an SDN-NFV network to respective options for user selection, enabling selection by a user of one of the respective options for a desired QoE or service parameter profile, and implementing the SDN-NFV network configuration for the user that corresponds to the QoE or service parameter profile. The selection of a desired QoE or service parameter profile is provided by user control of a QoE knob that enables selection of respective QoE or service parameter profile options for a particular network service provider and/or respective QoE or service parameter profile options for two or more network service providers. A real-time estimate of the QoE may be provided to the user by analyzing data traffic for information relating to QoE for informing the user's QoE choice. In this fashion, the disclosed systems and methods enable a user to provide user control to the network configurations for the services to be received by that customer.

In operation, a user's QoE or service parameter profile selection is communicated to a network service control module to control a corresponding virtual machine configuration to allocate appropriate amounts of resources needed to provide the selected QoE or service parameter profile for implementation by a SDN-NFV network manager. A network service orchestrator may also be used to determine from a selected service and QoE or service parameter profile what required Virtualized Network Functions (VNFs) and VNF chains are needed to implement the selected service and QoE or service parameters for a desired QoE. Alternatively, the network service orchestrator may comprise a grouping of orchestration apps in a service chain. In this embodiment, cloudlets of NFV grouped by topic are provided for maximizing network efficiency. Orchestrator apps from different network service providers may also be configured to share resources for allocation to provide the selected QoE or service parameter profile.

The dynamic nature of the SDN-NFV networks allows the user to configure and control not only the QoE, but additional service parameters such as Security, Latency, High-Definition/Standard-Definition Voice/Audio/Video, Audio/Video Equalization, method of payment (e.g. pay per transaction or part of the monthly bill, etc). Specifically, the user can choose between the levels of security, which may be different encryption algorithms (e.g. key length, type of algorithm, etc.) or a graded security index, such as gold-silver-bronze (in which case the SDN-NFV network will map these indices to sets of security algorithm parameters). The user may also choose and/or even switch during a session between High Definition or Standard Definition Voice/Audio/Video. User may also dynamically equalize the Audio Quality, by configuring various frequencies, reverbs, etc., and signaling them to the SDN-NFV network, which will then accordingly configure the necessary VNFs. This feature may be especially useful for the streaming of live performances. The user may also configure the type of payment for the services being accessed. For example, the user may choose a per-transaction billing (e.g. paid against a credit card) versus being added to his/her monthly bill. Finally, the user may select the latency, so that setting a low latency may improve the performance of applications such as on-line gaming or remote control of drones/robots/surgical equipment.

The corresponding system includes a QoE knob for user selection of particular QoE or service parameter profile of a Software Defined Networking Network Function Virtualization (SDN-NFV) network, where the respective knob positions are mapped to particular QoE or service parameter profiles. At least one service control module is provided to implement the SDN-NPV network configuration that corresponds to the desired QoE or service parameter profile mapped to a user-selected position of the QoE knob. In exemplary embodiments, the QoE knob enables selection of a desired QoE or service parameter profile option for a particular network service provider or desired QoE or service parameter profile options for two or more network service providers. In exemplary embodiments, the network service parameters mapped to the QoE knob for control by the user include security, latency, high-definition versus standard definition voice, audio and video, audio/video equalization, and method of payment for services being accessed.

Further embodiments of the system include a traffic analyzer that provides a real-time estimate of the QoE to the user by analyzing data traffic for information relating to QoE. A SDN-NFV network manager may also be provided whereby the at least one service control module communicates a user's QoE or service parameter profile selection to a network service control module that controls a corresponding virtual machine configuration to allocate appropriate amounts of resources needed to provide the selected QoE or service parameter profile for implementation by the SDN-NFV network manager. In exemplary embodiments, the at least one service control module determines from a selected service and QoE or service parameter profile what required Virtual Network Functions (VNFs) and VNF chains are needed to implement the selected service and QoE.

Further exemplary embodiments of the system include a set of orchestration apps grouped in a service chain so as to provide cloudlets of Network Function Virtualization (NFV) grouped by topic for maximizing network efficiency. In such embodiments, the at least one service control module determines from a user selection what service chains of VNFs in data centers are needed and selects the service chains of VNFs based on geographic proximity of at least one corresponding data center to the user. The orchestrator apps may be provided by different network service providers to enable sharing of resources for allocation in accordance with the QoE or service parameter profile selected by the user using the QoE knob.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, of which.

DETAILED DESCRIPTION OF ILLUSTRATIVE EMBODIMENTS

The invention described herein may be understood more readily by reference to the following detailed description taken in connection with the accompanying figures and examples, which form a part of this disclosure. It is to be understood that this invention is not limited to the specific products, methods, conditions or parameters described and/or shown herein, and that the terminology used herein is for the purpose of describing particular embodiments by way of example only and is not intended to be limiting of any claimed invention. Similarly, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer both to methods and systems/software for implementing such methods.

A detailed description of illustrative embodiments of the invention will now be described with reference to FIG. 1-8. Although this description provides a detailed example of possible implementations of the invention, it should be noted that these details are intended to be exemplary and in no way delimit the scope of the invention.

The system and methods described herein implement a QoE knob that the user may use to configure and control chained services over a virtualized cloud network. It will be appreciated that the term "user" as used herein is intended to include not only individual humans operating on the network but also appliances and other processor based systems for which QoE and other service parameter selections are desirable. To understand what such a QoE knob is and what it does, one must first appreciate the difference between Quality of Experience (QoE) and Quality of Service (QoS).

Qoe Vs. Qos

Quality of Experience (QoE) is a measure of a customer's experiences with a service (web browsing, phone call, TV broadcast, call to a Call Center, etc.). QoE focuses on the entire service experience, and is a more holistic evaluation than the more narrowly focused user experience (focused on a software interface) and customer-support experience (support focused). Thus, QoE is a broader concept than Quality of Service (QoS), although they are highly inter-dependent. Essentially, QoS is a characterization of the physical aspects of the network, such as throughput, latency etc. On the other hand, QoE includes qualitative characterization from the user's experience, either a priori or after the event. More information relating QoE and QoS may be found in an article entitled "Quality of telecommunication services: concepts, models, objectives and dependability planning", ITU-T E.800, September/2008, available at http://www.itu.int/rec/dologin_pub.asp?lang=e&id=T-REC-E.800-200809-I!!PDF-E and in a Qualinet White Paper on "Definitions of Quality of Experience", Output from the fifth Qualinet meeting, Novi Sad, Mar. 12, 2013, available at https://hal.archives-ouvertes.fr/hal-00977812/documen.

In exemplary embodiments, QoE may be characterized in simple gradations such as Gold-Silver-Bronze levels, each of which can be mapped to different sets of QoS parameters, with highest throughput to lowest throughput, lowest latency to highest latency, etc. While these are examples of a static specification of QoE, modern technology also allows one to estimate the user's QoE in real-time or near-real-time. For example, a simple rating system after each communication transaction can be used as an input to aggregate the user's experience. In other words, after or even during a communication transaction, the user may input his/her degree of satisfaction via a rating selected on a touch-screen, or even provided as a vocal input. Such user feedback may also be provided after the communication transaction.

The process of real-time or near-real-time QoE estimation may also be automated to some extent. For example, in a Skype video call, an automated analysis may be performed of the ongoing session, in which the number of times the user says "can you hear me now" or "the voice is choppy" or "your video is frozen" etc. can be counted and used as an input to estimate the user's experience. In data traffic, the number of retransmissions can be used to estimate the quality of experience. As will be appreciated by those skilled in the art, the QoE is represented by a number of service parameters that the user may also set separately in exemplary embodiments. Thus, QoE and service parameters (as opposed to QoS) will be used interchangeably herein with the understanding that a particular QoE is made up of a number of service parameters.

Figure 1:
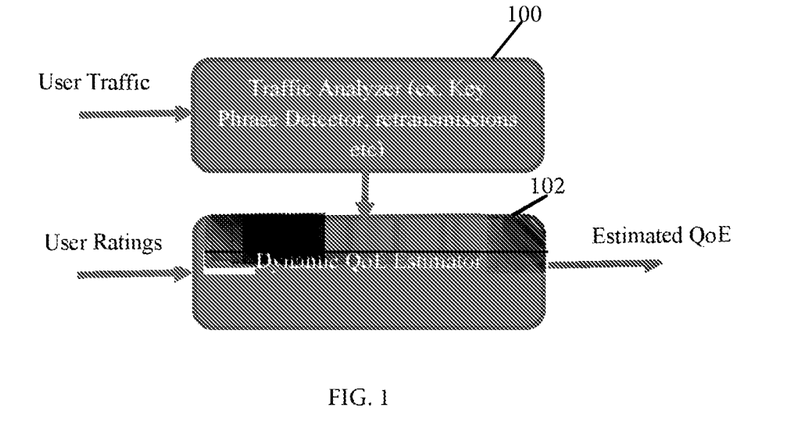
FIG. 1 illustrates a simple example of a near-real-time automated QoE estimator in an exemplary embodiment.

FIG. 1 illustrates a simple example of such a near-real-time automated QoE estimator in an exemplary embodiment. As illustrated, the user traffic is provided to a traffic analyzer 100 that analyzes the data traffic to extract key phrases, retransmissions, etc. in order to estimate the QoE during a session. The results of such estimation are combined with user QoE ratings in dynamic QoE estimator 102 in order to provide an estimated QoE. In an exemplary embodiment, the QoE estimator 102 is a set of rules that maps the parameters obtained from the Traffic Analyzer 100 and User Ratings into a number, say between 1-10, with 10 representing the highest QoE.

Figure 2:
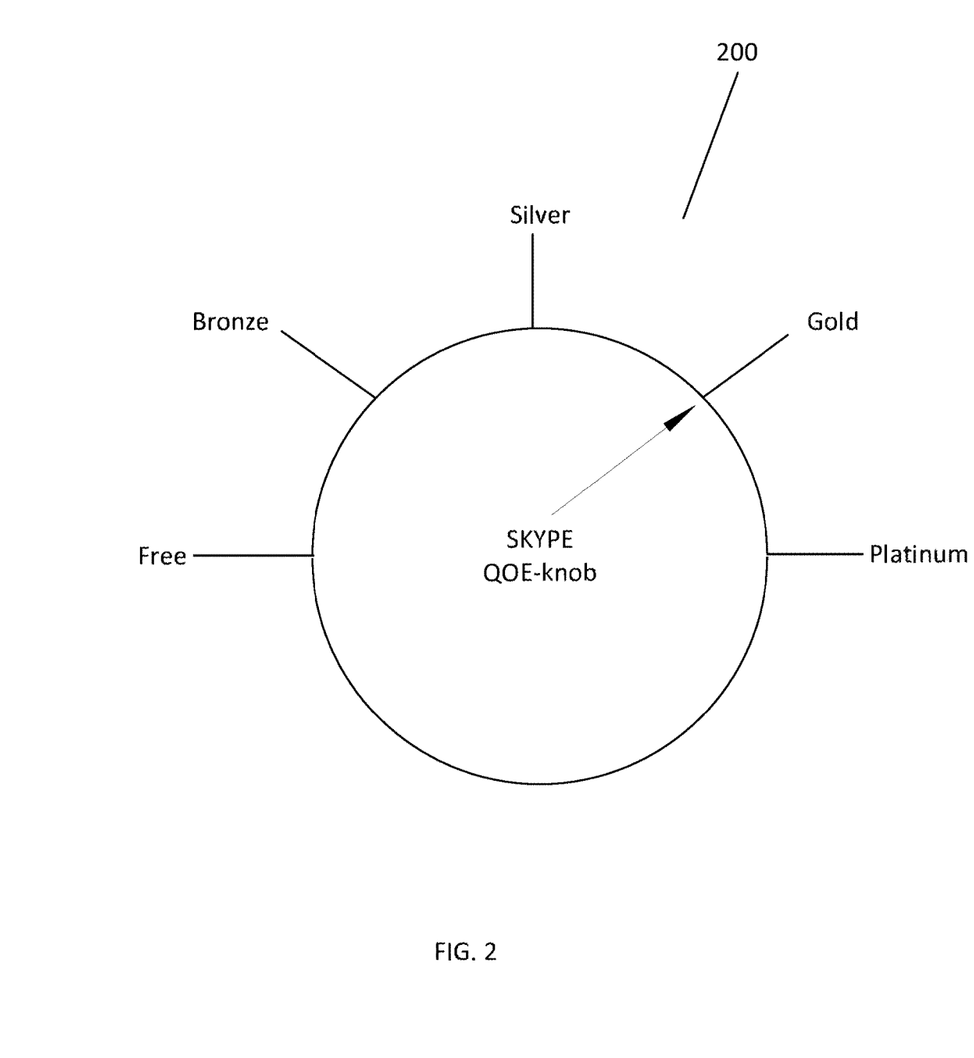
FIG. 2 illustrates an exemplary QoE knob for services of a particular third party OTT provider, in this case Skype.

FIG. 2 illustrates an exemplary QoE knob including different degrees of service as well as different OTT service offerings. In accordance with the invention, such a QoE knob would be provided on the end-user's device as a hardware knob or a software knob that may be accessed via a touchscreen input, keyboard input, mouse input, and the like. If the end-user is a consumer, the device could be a smartphone. If the end-user is a business customer, the device could be some GUI device.

As shown in FIG. 2, the user may position the QoE knob 200 to point to any of the available service options, such as Bronze/Silver/Gold/Platinum. The location of each of these options is mapped to a particular QoE profile that is mutually agreed upon by the end-user and the network service provider. The table below provides an example mapping.

| QoE Class | Data Rate | Latency | Reliability | Priority |
| --- | --- | --- | --- | --- |
| Platinum | 50 Mbps | 5 msec | 99.999 | 5 |
| Gold | 25 Mbps | 10 msec | 99.99 | 4 |
| Silver | 10 Mbps | 20 msec | 99.99 | 3 |
| Bronze | 5 Mbps | 50 msec | 99.9 | 2 |

Figure 3:
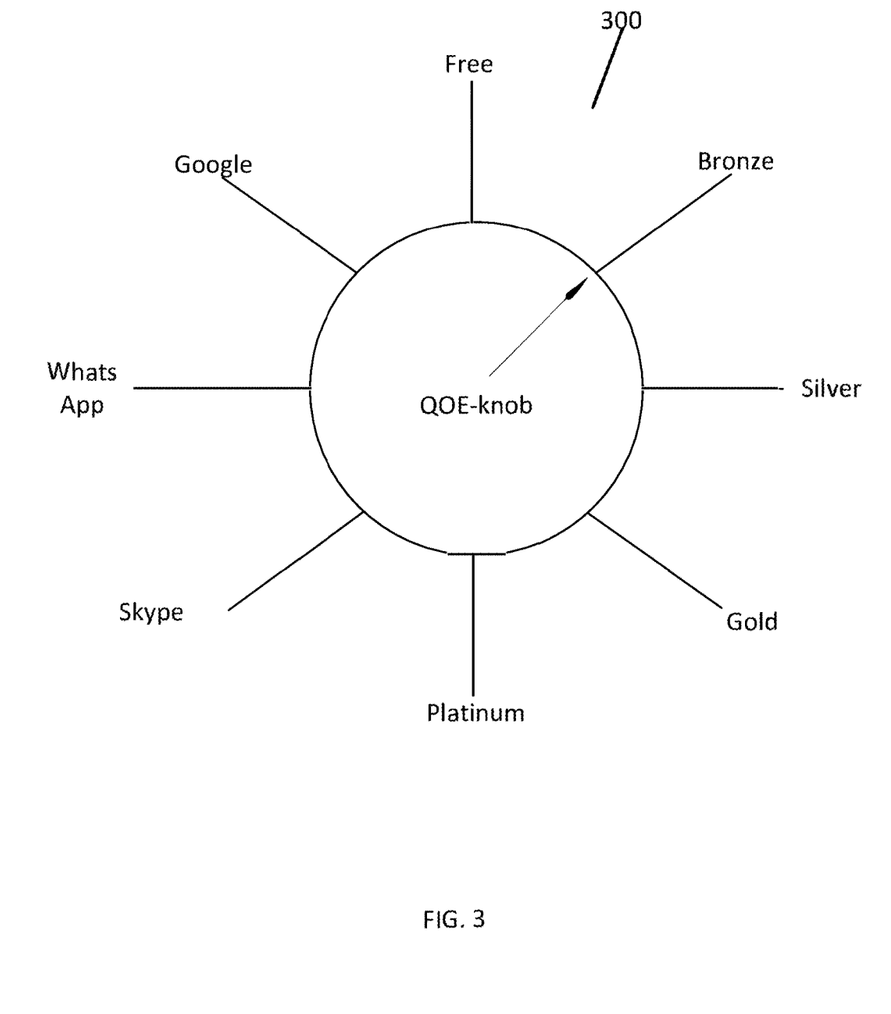
FIG. 3 illustrates an exemplary QoE knob including different degrees of service as well as different OTT service offerings.

It is also possible that the QoE knob 200 is more fine-grained, meaning that the QoE scale is quantized to a much greater number of levels than just 4. For example, different services at different levels of QoE may be available for selection using the QoE knob 200. In the example of FIG. 3, such third party services may include Skype, Whatsapp, and Google. In any case, the end-user will have continuous control of the level of QoE and the resulting quality versus cost.

As shown in FIG. 3, the QoE knob 300 could also include 3rd party OTT service offerings, with no guaranteed QoE profiles. Including these right next to the service provider's bronze/silver/gold service offerings will not only make it convenient to choose between the two, but it can also highlight the QoE value that the service provider brings to the customer. For example, if it is alleged that a particular service has a 99.9% availability, the 99.9% availability will be put in context relative to other service providers by, for example, showing that another service provider available for selection using the QoE knob has a 99.999% availability. The QoE knob 300 thus conveys to the end-user the value of the high quality platform.

The network service provider can also offer the QoE knob 300 services to the 3rd party OTT players themselves. In such a case, the OTT application would support multiple levels of QoE. In both cases, the QoE is selected by the end-user using the QoE knob 300, so that net-neutrality considerations may not come into the picture.

Figure 4:
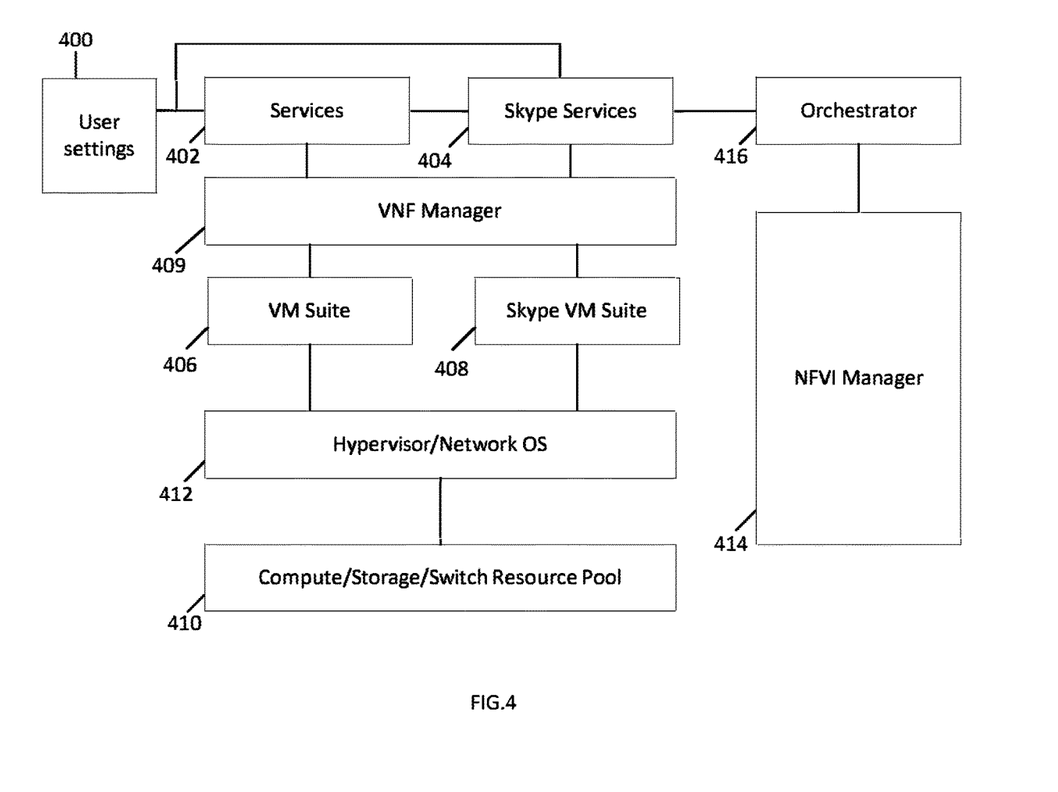
FIG. 4 illustrates an exemplary simplified network architecture for implementing the QoE knob functionality.

FIG. 4 illustrates an exemplary simplified network architecture for implementing the QoE knob functionality. In operation, the user's QoE knob settings 400 are communicated to the network Service Control Module 402 or OTT Service Control Module 404. These control modules 402, 404 are, in turn, directed to the corresponding VM (Virtual Machine) configuration control 406, 408 via Virtual Network Function (VNF) manager 409, where appropriate amounts of resources are configured under control of VNF manager 409 in a conventional fashion to provide the requested QoE. Those skilled in the art will appreciate that VNF manager 409 controls the virtual machine configurations of VM suites 406, 408 in a data center specific fashion. The selected configurations are, in turn, realized on the physical platform by allocating appropriate amounts of compute/storage/switching resources 410 under the control of the VM hypervisor/network operating system 412. The SDN-NFV network manager 414 implements the settings subject to inputs from the network service orchestrator 416, which provides overall management of end to end communications. For example, the network service orchestrator 416 may determine that the user settings require a chaining of certain set of VNFs and communicates these to the NFVI manager 414. It is also recognized that the Compute/Storage/Switch Resources (410), Hypervisor/Network-OS (412), VN Suites (406, 408) and NFVI Manager (414) are typically realized within data centers, which may be distributed across the coverage region of the operator. In such a case, the service orchestrator 416 also determines which data center should be invoked for the service chaining. For example, if low latency is required, a data center close to the user may be chosen. The mechanics of the configuration processes used in the embodiment of FIG. 4 are well known in the art of SDN controlled NFV networks and need not be described further here.

Figure 5:
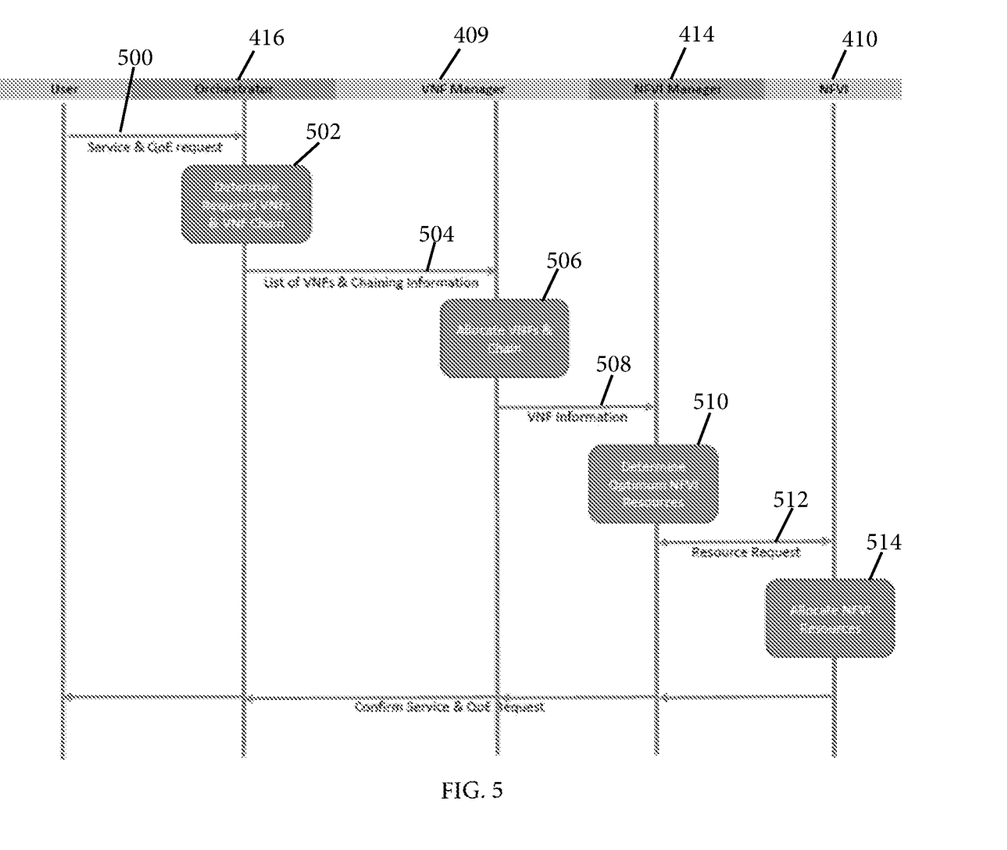
FIG. 5 illustrates the process of how a user can choose a QoE and have the network configure it in an exemplary embodiment.

FIG. 5 illustrates the process of how a user can choose a QoE and have the network configure it in an exemplary embodiment. As illustrated, the user requests a communications service and selects a desired QoE at 500. The network service orchestrator 416 then determines from the selected service and QoE what required Virtual Network Functions (VNFs) and VNF chains are needed to implement the selected service and QoE at 502. The resulting list of candidate VNFs and VNF chains are communicated to the VNF manager 409 at 504. The VNF manager 409 then allocates the VNFs and VNF chains at 506. The allocated VNF information is then communicated at 508 to the NFVI manager 414 to determine an optimal NFVI network resource allocation. The list of requested network resources is then provided at 512 to the NFVI 410 for allocation of the requested network resources at 514. Confirmations are provided for each step. Those skilled in the art will appreciate that the functions illustrated in FIG. 5 are all well-known in the art of NFV/SDN. For example, the functionality of the elements is described in AT&T's ECOMP white paper http://about.att.com/content/dam/snrdocs/ecomp.pdf, which is incorporated herein by reference.

Figure 6:
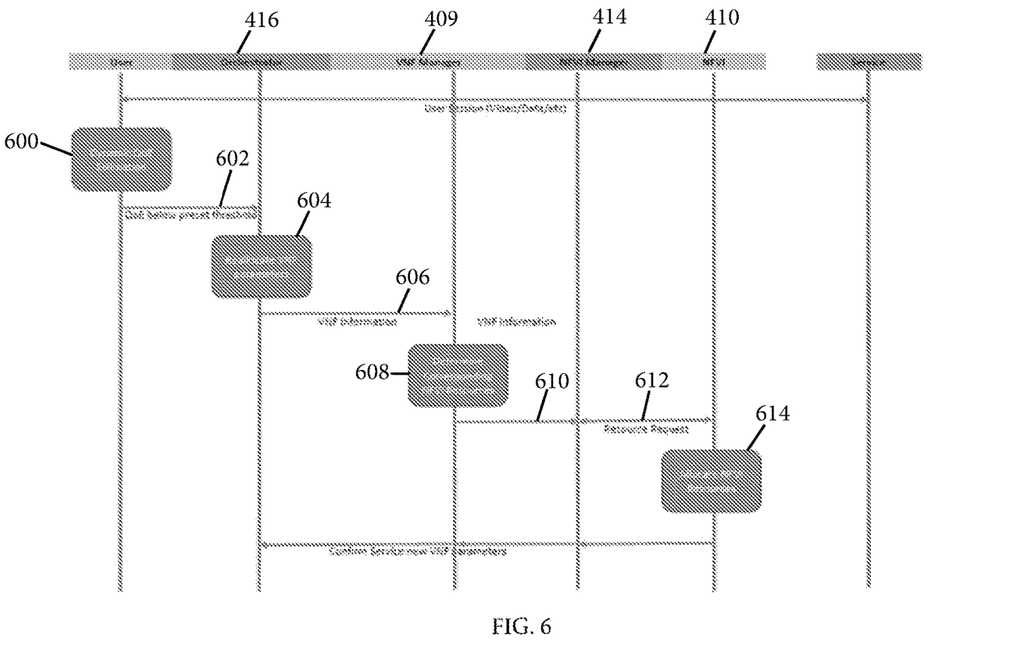
FIG. 6 illustrates how the network reconfigures automatically based on the dynamic QoE assessment in an exemplary embodiment.

FIG. 6 illustrates how the network reconfigures automatically based on the dynamic QoE assessment in an exemplary embodiment. As illustrated in FIG. 6, the user provides a dynamic QoE estimation at 600 using, for example, the near-real-time automated QoE estimator 102 shown in FIG. 1. The QoE below a preset threshold is provided at 602 to the network service orchestrator 416, which reallocates the VNF parameters at 604. The network service orchestrator 416 then provides the VNF network information to the VNF manager 409 at 606. The VNF manager 409 determines what corresponding NFVI resources are needed at 608, and the VNF resource information is provided to the NFVI manager 414 at 610. The NFVI manager 414 then issues a resource request 612 to the NFVI 410, which allocates the requested NFVI resources at 614. Confirmations are provided for each step. Those skilled in the art will appreciate that the respective functions illustrated in FIG. 6 are also well-known in the art of NFV/SDN.

Orchestration Apps

Figure 7:
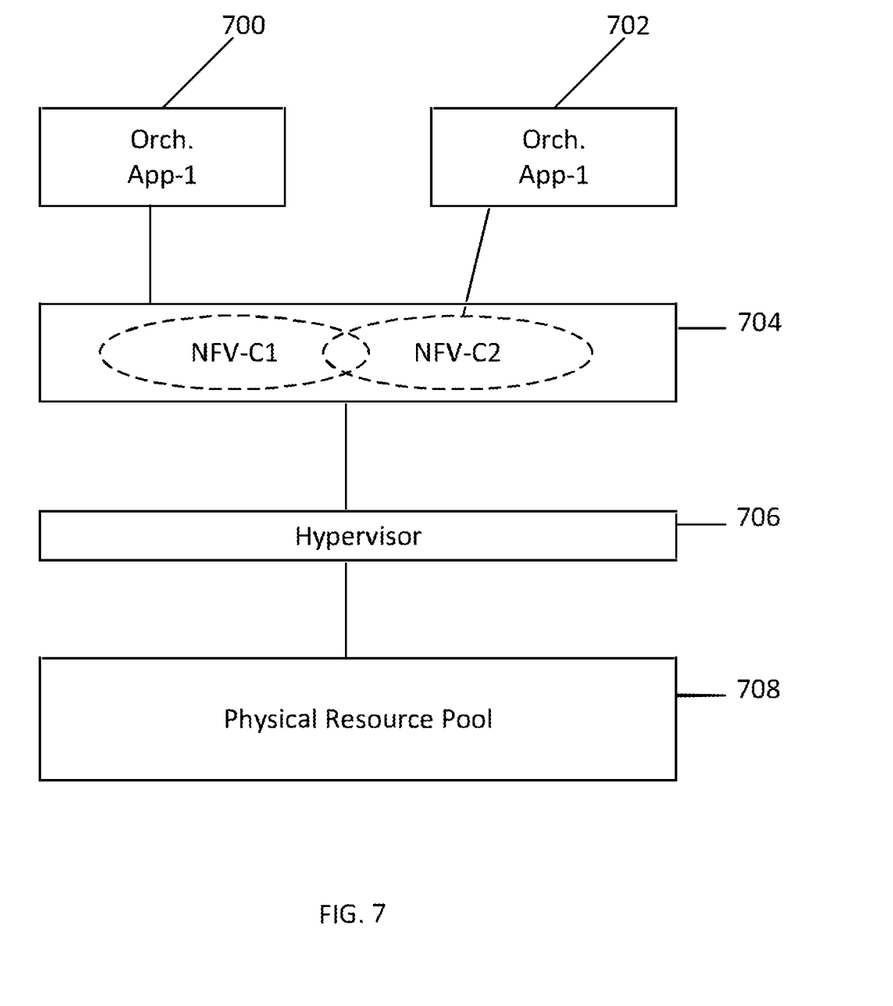
FIG. 7 illustrates a method to architect orchestration functionality in an exemplary embodiment.

FIG. 7 illustrates a method to architect orchestration functionality in an exemplary embodiment. It is first observed that while the SDN-NFV framework allows a multitude of NFV functions created by the network service provider and 3rd parties to be handled in the SDN control methodology, the large number and variety of NFV functions can make the service definition and service chaining a complex task, which can become unwieldy and inefficient if they are not organized well. An analogy here is made to the web based functionalities versus app based functions on the Internet. Whereas the web offers a huge and unconstrained multitude of functionalities, apps create a subset of web functionalities selected according to an overarching user-centric functionality and make it consumable in an organized and efficient manner. In a similar manner, "Orchestration Apps" are provided in an exemplary embodiment as subsets of NFV functions selected according to an overarching function. Examples include: Security, Identity Management, Mobility, QoE, Resilience, Provisioning, OAM, Topology/Distribution etc.

For example, a Security Orchestration App would consider all Security NFVs and create a sub-orchestration framework, which enables Security Service creation & management to be achieved efficiently. Similarly, a Topology/Distribution Orchestration App would provide to the Service Creation Architect all possible network cloudlets in a Distributed NFV environment so that he/she may optimally create an end-to-end service chain with optimal characteristics. For example, certain latency sensitive functions may be realized in the edge cloudlets whereas the others may be placed in larger data centers in the service provider's core network.

FIG. 7 illustrates how Orchestration apps 1 (700) and 2 (702) provide cloudlets NFV-C1 and NFV-C2 at 704 for control of the hypervisor 706. The hypervisor 706, in turn, selects the needed resources from the physical resource pool 708 for maximally efficient operation. It will be appreciated by those skilled in the art that the Orchestration apps enable the grouping of apps by topic and then orchestrating them for more efficient operation and reduced system complexity.

Multi-Party Cloud and Orchestration Framework

Cloud networks are being developed and maintained by multiple network service providers, including traditional Telco service providers such as AT&T, Verizon, etc., as well as Web Services Providers, such as Amazon, Microsoft, etc. As will be appreciated by those skilled in the art, one important distinction between Telco cloud and web clouds is the reliability and availability. Whereas web clouds may provide 99.9% availability, Telco clouds often require 99.999% availability. As a result, it is beneficial for these clouds to be interconnected and workloads to be placed optimally across multiple cloud networks, based on reliability, current load conditions, proximity & latency considerations, etc. Similar to roaming scenarios in traditional mobile networks, Service Provider Clouds may be interconnected in such a manner that a Heterogeneous Multi-Party Cloud environment be created and used according to engineering considerations as well as business arrangements. An embodiment of such a system is shown in FIG. 8.

Figure 8:
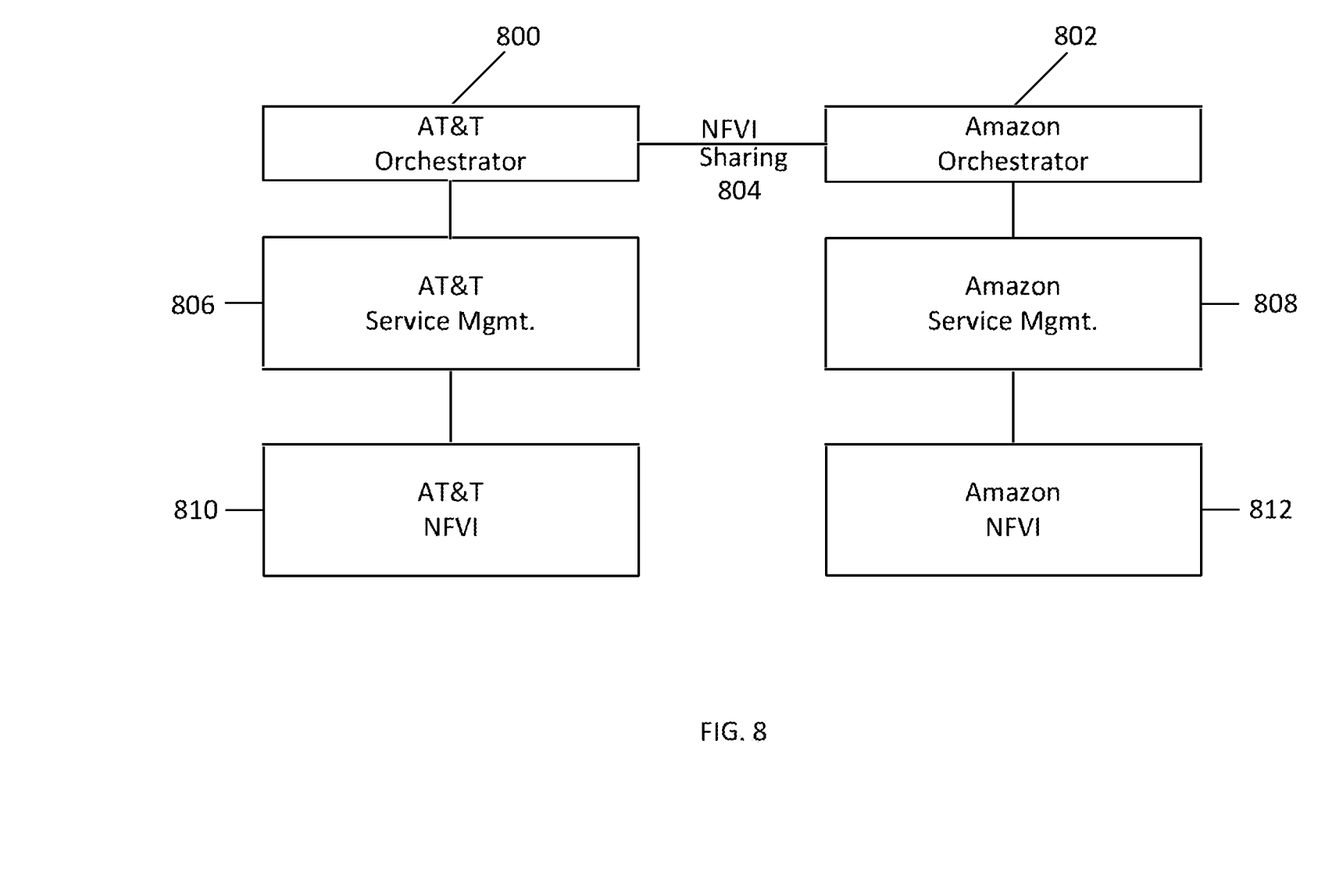
FIG. 8 illustrates an embodiment of a multi-party network service provider cloud in an exemplary embodiment.

FIG. 8 illustrates an embodiment of a multi-party network service provider cloud in an exemplary embodiment. As illustrated in FIG. 8, the orchestrators 800 and 802 of respective network service providers share NFVI resources at 804. Each orchestrator 800, 802 has its own network service provider service manager 806, 808 that manage the respective NFVI functionalities at 810, 812.

Although the problem addressed herein is stated in the context of voice communications, those skilled in the art will appreciate that the invention essentially extends to any other communication service as well where the end users are faced with choosing between low cost and high quality. For example, the dynamic nature of the SDN-NFV networks allows the user to configure and control not only the QoE, but also the end user may configure and control additional service parameters such as Security, Latency, High-Definition/Standard-Definition Voice/Audio/Video, Audio/Video Equalization, method of payment (e.g., pay per transaction or part of the monthly bill, etc.). Specifically, the user can choose between the levels of security, which may be different encryption algorithms (e.g., key length, type of algorithm, etc.) or a graded security index, such as gold-silver-bronze (in which case the SDN-NFV network will map these indices to sets of security algorithm parameters). The user may also choose and/or even switch during a session between High Definition or Standard Definition Voice/Audio/Video. The user may also dynamically equalize the audio quality by configuring various frequencies, reverbs, etc., and signaling them to the SDN-NFV network, which will then accordingly configure the necessary VNFs. This feature may be especially useful for streaming of live performances. The user may also configure the type of payment for the services being accessed. For example, the user may choose a per-transaction billing (e.g., paid against a credit card) versus being added to his/her monthly bill. Finally, the user may select the latency, so that setting a low latency may improve the performance of applications such as on-line gaming or remote control of drones/robots/surgical equipment.

While examples of a telecommunications system in which a method for implementing a QoE control knob have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium as described herein is not a signal, a transient signal, or a propagating signal. A computer-readable storage medium as described herein is instead an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the invention as illustrated in the figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

The invention claimed is:

1. A method of providing user-controlled Quality of Experience (QoE) in a network of resources, comprising:
providing a user interface on a user device that integrates and allows user selection of QoE for a Software Defined Network Function Virtualization (SDN-NFV) network and user selection of QoE for an over the top (OTT) service network;
receiving a QoE user selection originating from the user interface, over the network; and
implementing on the network of resources a configuration to effectuate the QoE user selection, wherein implementing comprises coordinated orchestration of one or more virtual machine resources.

2. The method of claim 1, wherein providing the user interface comprises providing a QoE control knob on a display of the user device with both SDN-NFV network QoE options and OTT service network QoE options.

3. The method of claim 1, further comprising:
mapping at least one resource configuration of the SDN-NFV network to a QoE user selection option on the user device;
mapping at least one resource configuration of the OTT service network to a another QoE user selection option on the user device.

4. The method of claim 1, further comprising providing a real-time estimate of QoE to the user device for one of the SDN-NFV network and the OTT service network by analyzing data traffic for information relating to QoE.

5. The method of claim 1, wherein implementing comprises communicating the QoE user selection to a network service control module to control a corresponding virtual machine configuration to allocate resources needed to provide QoE associated with the QoE user selection for implementation by a network manager.

6. The method of claim 5, further comprising determining what Virtual Network Functions (VNFs) and VNF chains are needed to implement the QoE user selection.

7. The method of claim 6, further comprising grouping a set of orchestration apps in a service chain and providing cloudlets of Network Function Virtualization (NFV) grouped by topic for maximizing network efficiency.

8. The method of claim 6, further comprising determining from the QoE user selection what service chains of VNFs in data centers are needed and selecting the service chains of VNFs based on geographic proximity of at least one corresponding data center to the user device.

9. The method of claim 8, further comprising enabling orchestrator applications from the SDN-NFV network and the OTT service network to share resources for allocation to implement the QoE selection.

10. The method of claim 1, wherein network service parameters are controlled by the QoE selection and they include security, latency, high-definition versus standard definition voice, audio and video, audio/video equalization, and method of payment for services being accessed.

11. A system for providing user-controlled Quality of Experience (QoE) in a network of resources, comprising:
a user interface on a user device that integrates and allows a user selection of QoE for both a Software Defined Network Function Virtualization (SDN-NFV) network and a an over the top (OTT) service network, wherein a first user selection causes implementation of a first QoE associated with a SDN-NFV network and a second user selection causes implementation of a second QoE associated with the OTT service network; and
at least one control module that implements a network configuration that corresponds to the user selection received, from the user interface, through coordinated orchestration of one or more virtual machine resources of the SDN NFV network and the OTT service network.

12. The system of claim 11, wherein the user interface comprises a control knob that enables the user selection of QoE for the both the SDN-NFV network and the OTT service network.

13. The system of claim 11, further comprising a traffic analyzer that provides a real-time estimate of QoE to the user device by analyzing data traffic for information relating to QoE for the SDN-NFV network and the OTT service network.

14. The system of claim 11, further comprising a network manager, wherein the at least one control module communicates the user selection to a network service control module that controls a corresponding virtual machine configuration to allocate appropriate amounts of resources needed to implement the user selection by the network manager.

15. The system of claim 14, wherein the at least one control module determines from the user selection what required Virtual Network Functions (VNFs) and VNF chains are needed to implement the user selection.

16. The system of claim 15, further comprising a set of orchestration applications grouped in a service chain so as to provide cloudlets of Network Function Virtualization (NFV) grouped by topic for maximizing network efficiency.

17. The system of claim 16, wherein the at least one service control module determines from the user selection what service chains of VNFs in data centers are needed and selects the service chains of VNFs based on geographic proximity of at least one corresponding data center to the user device.

18. The system of claim 17, further comprising orchestrator apps from the SDN-NFV network and the OTT service network that enable sharing of resources for allocation in accordance with the user selection.

19. The system of claim 11, wherein the user interface combines options for selection of multiple QoE implementations for the SDN-NFV network and the OTT service network.

20. The system of claim 11, wherein the network control module map at least one resource configuration of the SDN-NFV network to a QoE user selection option on the user device and at least one other resource configuration of the OTT service network to a another QoE user selection option on the user device.

* * * * *